(12) United States Patent
Takeda et al.

(10) Patent No.: US 9,081,183 B2
(45) Date of Patent: Jul. 14, 2015

(54) VIRTUAL IMAGE DISPLAY DEVICE

(71) Applicant: SEIKO EPSON CORPORATION, Tokyo (JP)

(72) Inventors: Takashi Takeda, Suwa (JP); Takahiro Totani, Suwa (JP); Akira Komatsu, Kamiina-gun (JP); Masayuki Takagi, Shiojiri (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 346 days.

(21) Appl. No.: 13/783,758

(22) Filed: Mar. 4, 2013

(65) Prior Publication Data

US 2013/0235440 A1 Sep. 12, 2013

(30) Foreign Application Priority Data

Mar. 7, 2012 (JP) ................................ 2012-050121

(51) Int. Cl.
*G02B 26/08* (2006.01)
*G02B 27/01* (2006.01)
(52) U.S. Cl.
CPC ........ *G02B 27/0176* (2013.01); *G02B 27/0172* (2013.01); *G02B 2027/0156* (2013.01); *G02B 2027/0178* (2013.01)

(58) Field of Classification Search
CPC .............. G02F 1/1333; G02B 27/0172; G02B 27/0176
USPC ............................ 359/197.1, 198.1, 631, 633
See application file for complete search history.

(56) References Cited

U.S. PATENT DOCUMENTS

| 2005/0264502 | A1 | 12/2005 | Sprague et al. |
| 2009/0096714 | A1* | 4/2009 | Yamada ............................ 345/8 |
| 2010/0060551 | A1 | 3/2010 | Sugiyama et al. |

FOREIGN PATENT DOCUMENTS

| JP | A-2007-178941 | 7/2007 |
| JP | A-2007-537465 | 12/2007 |
| WO | WO 2009/041055 A1 | 4/2009 |

* cited by examiner

*Primary Examiner* — Euncha Cherry
(74) *Attorney, Agent, or Firm* — Oliff PLC (57) ABSTRACT

Image lights formed by a light emitting device and a virtual-image forming member and external light transmitted through a visibility adjusting member and the virtual-image forming member can be observed in parallel in a see-through manner. In the observation of the external light, the visibility adjusting member enables visibility adjustment corresponding to the eyesight of a wearer. Therefore, the wearer can observe the external light without wearing a device for visibility adjustment such as glasses. Therefore, it is possible to suppress an increase in the size of a virtual image display device.

11 Claims, 10 Drawing Sheets

VIRTUAL IMAGE DISPLAY DEVICE

BACKGROUND

1. Technical Field

The present invention relates to a virtual image display device such as a head mounted display that is used while being mounted on the head.

2. Related Art

In recent years, as a virtual image display device for enabling formation and observation of a virtual image such as a head mounted display, various head mounted displays that scan an image light and project an image on the retinas of the eyes are proposed (see JP-A-2007-178941 (Patent Literature 1), WO2009/041055 (Patent Literature 2), and JP-T-2007-537465 (Patent Literature 3)). In particular, a head mounted display configured "see-through" in order to superimpose image light for forming a virtual image and external light, which is light from the external environment, one on top of the other is proposed (see, for example, Patent Literature 1).

However, when a wearer, who is an observer, is, for example, near-sighted and needs to correct the eyesight using a device for visibility adjustment such as glasses to observe the external light, if a device for forming a virtual image is the device disclosed in any one of Patent Literatures 1 to 3, the wearer wears the device in addition to the glasses or the like. In such a case, since a space for the glasses is secured on the side of the device for image formation, the device for image formation needs to be increased in size. According to the increase in size, it is likely that the weight of the device for image formation increases, a load on the wearer increases when the wearer wears the device, and design of the external appearance of the device is limited.

SUMMARY

An advantage of some aspects of the invention is to provide a virtual image display device that, when image light and external light are observed in parallel, enables visibility adjustment for observation of the external light and can suppress an increase in the size of the device.

An aspect of the invention is directed to a virtual image display device including: a signal-light modulating unit configured to emit a signal light modulated according to an image; a scanning optical system configured to scan the signal light made incident from the signal-light modulating unit to thereby emit the signal light as scanning light; a virtual-image forming member configured to receive irradiation of the scanning light from the scanning optical system and form a virtual image; and a visibility adjusting member configured to adjust visibility to allow a wearer to view the external environment. The visibility adjusting member is arranged to be located further on the outer side than the virtual-image forming member with respect to the eye of the wearer.

In the virtual image display device, the wearer is capable of observing, in parallel, image light formed by the virtual-image forming member or the like and external light transmitted through the visibility adjusting member. When the wearer views the external environment, the visibility adjusting member arranged to be located further on the outer side than the virtual-image forming member enables visibility adjustment. Therefore, the wearer does not have to wear a device for image formation in addition to the visibility adjusting member such as glasses. Consequently, an increase in the size of the virtual image display device is suppressed.

In a specific aspect of the invention, the virtual-image forming member includes a semitransparent film configured to receive the scanning light emitted from the scanning optical system to form a virtual image, allow external light to pass, and enable observation of the virtual image by the scanning light and observation of the external light. In this case, by using the semitransparent film, it is possible to realize a see-through configuration in which the virtual image and an external image can be recognized in a superimposed state.

In another aspect of the invention, the visibility adjusting member is arranged adjacent to the virtual-image forming member to cover the virtual-image forming member. The arranging the visibility adjusting member adjacent to the virtual-image forming member to cover the virtual-image forming member means not only that the visibility adjusting member covers the virtual-image forming member in a state in which the members are close to each other but also that the visibility adjusting member covers the virtual-image forming member in a state in which the members are integrated. Therefore, it is possible to make a configuration in front of the eye of the wearer compact.

In still another aspect of the invention, the scanning optical system is arranged to be located closer to the nose side than the eye of the wearer during wearing of the virtual image display device and arranged to be located closer to the wearer than the virtual-image forming member. Therefore, it is possible to suppress the worn device from excessively projecting to the side and the front side, suppress an increase in the feeling of weight due to deviation of the center of gravity of the device, and increase a degree of freedom of design of the device.

In yet another aspect of the invention, the virtual-image forming member is formed integrally to be located on the inner surface that is on the wearer side during wearing of the virtual image display device among the surfaces of the visibility adjusting member. Therefore, it is possible to realize a reduction in the weight and a reduction in the size of the device. Further, since a gap is not formed between the virtual-image forming member and the visibility adjusting member, it is possible to more satisfactorily recognize the virtual image and the external image.

In still yet another aspect of the invention, the virtual-image forming member is a film to be irradiated supported by the visibility adjusting member. Therefore, it is possible to stably support the thin film-like virtual-image forming member with the visibility adjusting member.

In further another aspect of the invention, the visibility adjusting member is detachably attached. Therefore, it is possible to select, according to a wearer having a different correction degree, the visibility adjusting member matching the correction degree.

In still further another aspect of the invention, the virtual-image forming member includes a film to be irradiated configured to receive irradiation of the scanning light and a supporting member configured to support the film to be irradiated. Therefore, if a material having sufficient strength is used for the supporting member, even if the visibility adjusting member is absent, it is possible to form the image light with the virtual image display device and observe the virtual image. The supporting member desirably has optical transparency and does not substantially have visibility.

In yet further another aspect of the invention, the virtual-image forming member includes a diffraction grating for forming the virtual image with the scanning light irradiated from the scanning optical system. Therefore, since the diffraction grating is used, it is possible to attain a function with a film-like member. Therefore, it is possible to form image light while securing a degree of freedom of design of the virtual image display device. Further, if the diffraction grating is attached to a transparent substrate, it is possible to realize a see-through configuration in which the virtual image and the external image can be recognized in a superimposed state.

In a further aspect of the invention, the virtual image display device further includes an eye-width adjusting section configured to enable, according to the eye width of the wearer, at least the scanning optical system and the virtual-image forming member among the scanning optical system, the virtual-image forming member, and the visibility adjusting member to integrally move with respect to the position of the eye of the wearer during wearing of the virtual image display device. Therefore, it is possible to align the eye width according to an individual difference of the eye width while keeping constant a relative positional relation between the virtual-image forming member and the visibility adjusting member.

In a still further aspect of the invention, the signal-light modulating unit includes a combined-light forming unit configured to form, as the signal light, combined light obtained by combining R light, G light, and B light and an optical fiber configured to propagate the signal light formed by the combined-light forming unit to the scanning optical system. In the signal-light modulating unit, the combined-light forming unit is arranged in a position corresponding to the ear side. The optical fiber extends along a path from the periphery of the ear to the periphery of the nose through the periphery of the eye along a face shape of the wearer during wearing of the virtual image display device to propagate the modulated signal light from the combined-light forming unit to the scanning optical system. Therefore, it is possible to disperse the weight of the entire device. It is possible to reduce the feeling of weight during the wearing of the virtual image display device by dispersing the load due to the device applied to the wearer and adjusting the center of gravity of the device and enable the wearer to more comfortably perform viewing. Further, it is possible to suppress the optical fiber from projecting to the side and the front side and increase a degree of freedom of design of the entire device.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A virtual image display device according to a first embodiment of the invention is explained in detail below with reference to the drawings.

Figure 1:
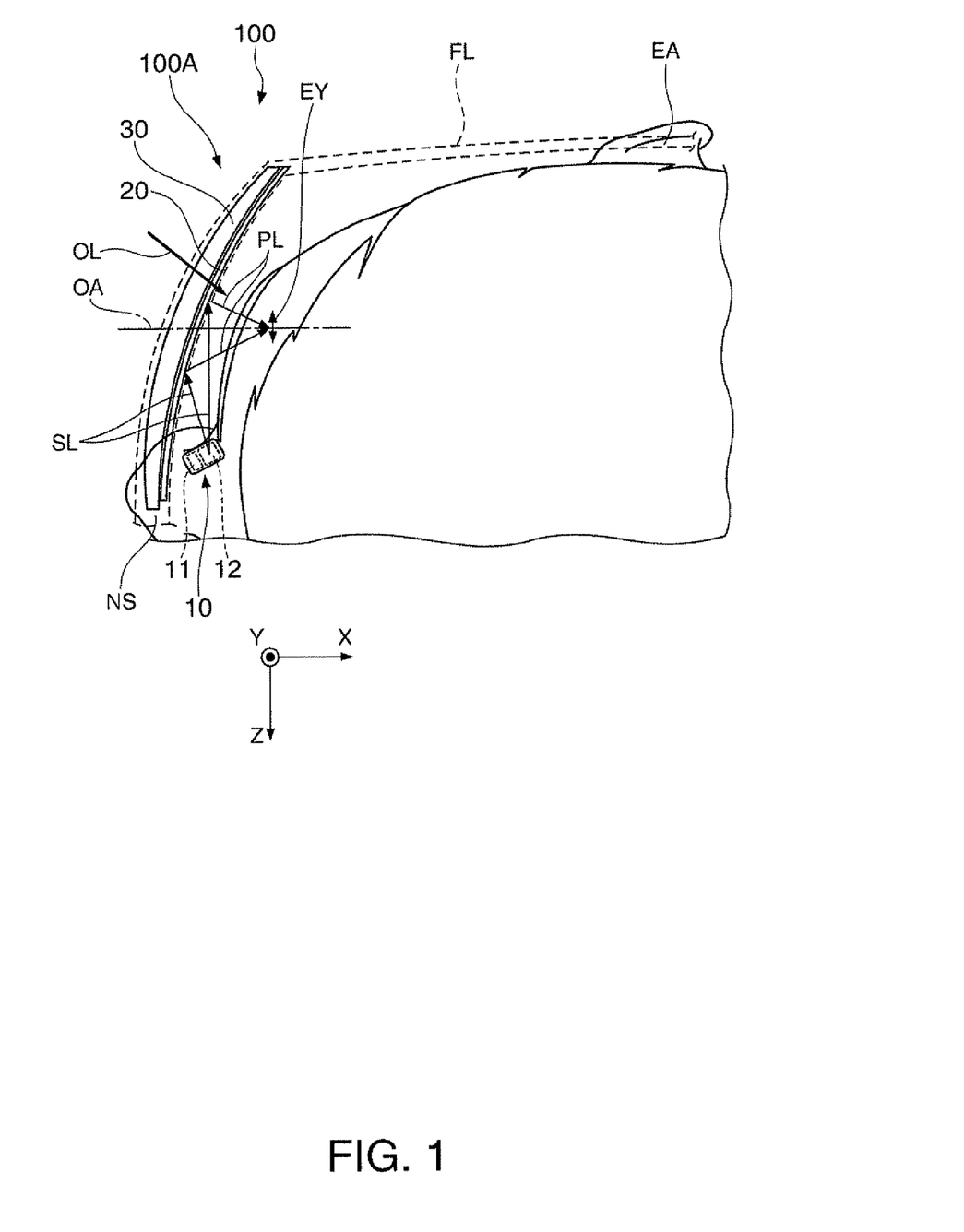
FIG. 1 is a diagram showing a virtual image display device according to a first embodiment.

A virtual image display device 100 according to this embodiment shown in FIG. 1 is a head mounted display having an external appearance like glasses. The virtual image display device 100 can allow a wearer, who should be an observer, wearing the virtual image display device 100 to recognize image light formed by a virtual image and allow the wearer to observe an external image in a see-through manner. In FIG. 1, a state in which the wearer wears the virtual image display device 100 is shown while being partially enlarged. A part of the virtual image display device 100 is omitted. Specifically, a first display device 100A is a section that forms a virtual image for the right eye in the virtual image display device 100. The virtual image display device 100 includes the first display device 100A for the right eye and a second display device for the left eye as a pair of display devices. The second display device includes structure same as the structure of the first display device 100A. In the second display device, the left and right of the first display device 100A are merely reversed. Therefore, the second display device is not shown in the figure. The first display device 100A alone also functions as a virtual image display device.

In the figure, a direction right in front of the wearer is the direction of an optical axis OA. A direction in which the optical axis OA extends from the virtual image display device 100 side to the wearer side is represented as +X direction, an up down direction for the wearer is represented as ±Y direction, and a left right direction for the wearer is represented as ±Z direction.

An example of the structure of the first display device 100A is explained to explain an example of the structure of the virtual image display device 100 below. The first display device 100A includes a light emitting device 10 that forms signal light and emits the signal light as scanning lights SL, a virtual-image forming member 20 functioning as a member to be irradiated that receives the scanning lights SL from the light emitting device 10 and forms image lights PL, and a visibility adjusting member 30 that allows external light OL to pass and adjusts an optical path of the external light OL according to the eyesight of the wearer. The light emitting device 10 is arranged around a nose NS of the wearer. The virtual-image forming member 20 is arranged to cover the front of an eye EY of the wearer in the front side (a −X side) of the light emitting device 10. The visibility adjusting member 30 is arranged adjacent to the virtual-image forming member 20 to cover the front of the virtual-image forming member 20 on the front side (the −X side) of the virtual-image forming member 20. In other words, the visibility adjusting member 30 is arranged to be located adjacent to the virtual-image forming member 20 in further on the far side, i.e., the outer side with respect to the eye EY of the wearer than the virtual-image forming member 20 in a direction along the optical axis OA. As explained in detail below with reference to FIG. 2B and the like, the virtual-image forming member 20 is fixedly attached to a frame FL that forms the external appearance of the entire device. On the other hand, the visibility adjusting member 30 is replaceably attached to the frame FL.

Figure 2A:
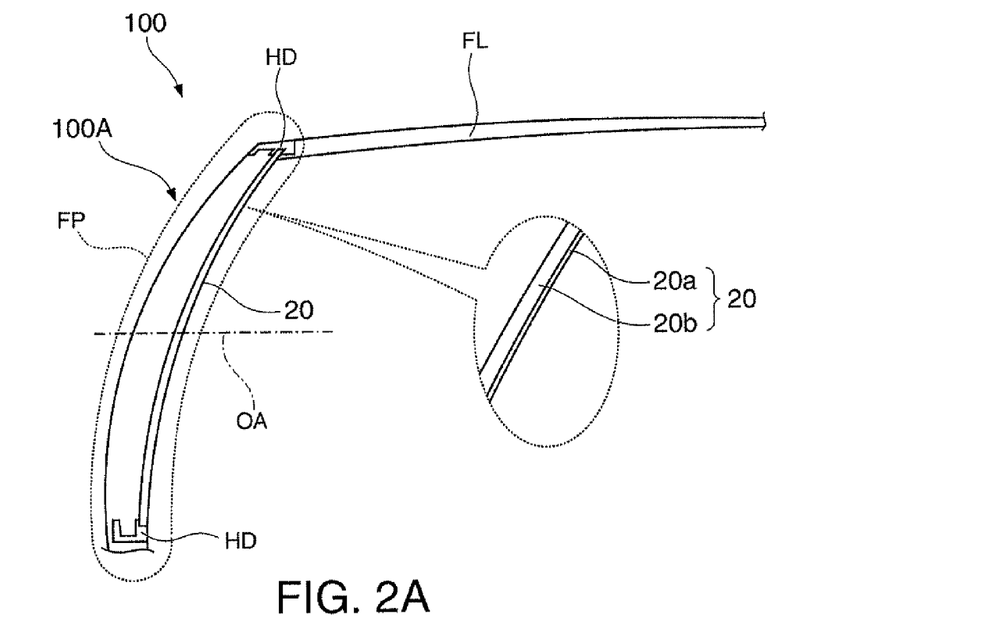
FIG. 2A is a sectional view showing the structure of the virtual image display device before attachment of a visibility adjusting member.

As shown in FIG. 2A while being partially enlarged, the virtual-image forming member 20 is a transparent base material including a semitransparent reflection film 20a, which is a film to be irradiated (a semitransparent film) that receives irradiation of scanning light, and a supporting member 20b that supports and fixes the semitransparent reflection film 20a. In other words, the virtual-image forming member 20 is a half mirror including the semitransparent reflection film 20a on the supporting member 20b, which is a transparent substrate made of resin. The supporting member 20b has intensity sufficient for supporting the semitransparent reflection film 20a and has substantially fixed thickness. Therefore, the supporting member 20b does not affect the optical path of the external light OL (see FIG. 1) to be transmitted, i.e., does not substantially have visibility.

The virtual-image forming member 20 is assembled and fixed to the frame FL by a holder HD. As shown in FIG. 1, the virtual-image forming member 20 is arranged to be located in front of the eye EY of the wearer and further on the far side (the −X side) with respect to the wearer than the light emitting device 10. Conversely, the light emitting device 10 is arranged further on the near side to the wearer than the virtual-image forming member 20 in the direction along the optical axis OA. In other words, the light emitting device is arranged between the eye EY of the wearer and the virtual-image forming member 20.

The virtual-image forming member 20 has size enough for covering the eye EY of the wearer from the front. The virtual-image forming member 20 receives the scanning lights SL irradiated from a scanning optical system 12 of the light emitting device 10 while being tilted in the −X direction, reflects the scanning lights SL to form a virtual image, and causes the wearer to recognize the virtual image. The shape of the virtual-image forming member 20 is a shape along the external appearance of the virtual image display device 100, i.e., the shape of the frame FL.

The virtual-image forming member 20, which is a half mirror that transmits light, is a tabular member having substantially uniform thickness and does not substantially have visibility. Therefore, the virtual-image forming member 20 not only forms the virtual image as explained above but also allows the external light OL passed through the visibility adjusting member 30 to pass without changing the optical path of the external light OL. In other words, not only the virtual image but also light from the external environment enters the eye EY of the wearer. The virtual image display device 100 has a see-through configuration for superimposing the virtual image and the external light OL and enabling the wearer to observe the virtual image and the external light OL.

Figure 2B:
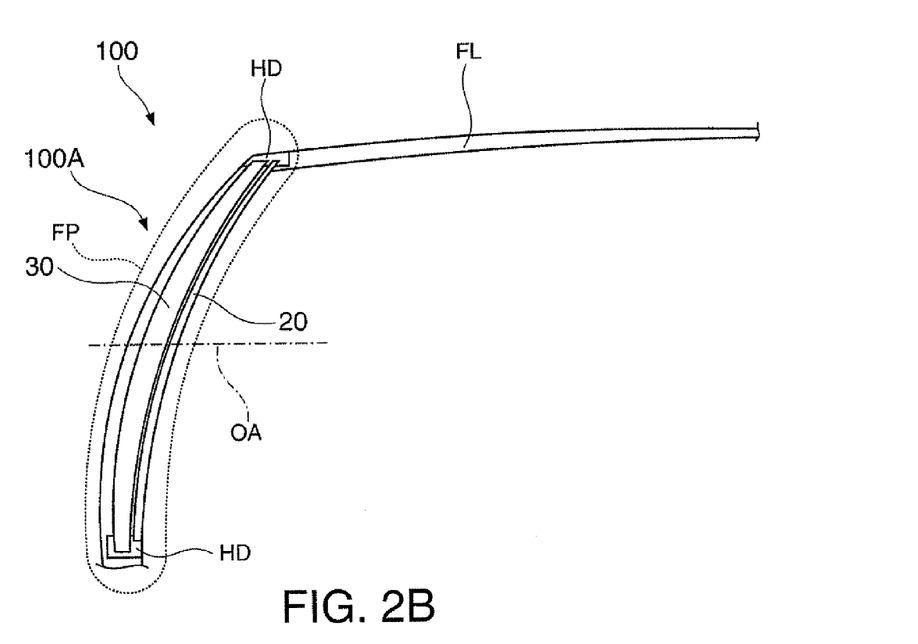
FIG. 2B is a sectional view showing the structure of the virtual image display device after the attachment of the visibility adjusting member.

The visibility adjusting member 30 is a lens made of resin for visibility adjustment (eyesight correction). Specifically, the visibility adjusting member 30 refracts the external light OL according to the eyesight of the wearer, whereby the wearer can observe an external image in a clear state. As shown in FIGS. 2A and 2B, in the virtual image display device 100, the visibility adjusting member 30 is configured detachable, i.e., replaceable to adapt the virtual image display device 100 to a degree of correction that is different depending on a wearer. As shown in the figures, the visibility adjusting member 30 has a shape substantially along the virtual-image forming member 20. In other words, like the virtual-image forming member 20, the visibility adjusting member 30 has a shape along the shape of the frame FL.

The structure of an eye-front portion FP including the visibility adjusting member 30 in the virtual image display device 100 is explained with reference to FIGS. 2A and 2B.

First, as shown in FIG. 2A, in a state before the visibility adjusting member 30 is attached, in the virtual image display device 100, only the virtual-image forming member 20, out of the virtual-image forming member 20 and the visibility adjusting member 30 is fixed and assembled to its original position of the frame FL by the holder HD in the eye-front portion FP. If a material having sufficient strength is used for the supporting member 20b, even in a state in which the visibility adjusting member 30 is absent, the virtual image display device 100 can form image light. For example, a person who does not need correction of eyesight can perform a see-through observation using the virtual image display device 100 even in the state shown in FIG. 2A.

On the other hand, as shown in FIG. 2B, in a state in which the visibility adjusting member 30 is attached to be located further on the far side, i.e., the outer side with respect to the wearer than the virtual-image forming member 20 in the direction along the optical axis OA, since visibility is adjusted, even a wearer who needs correction of eyesight can observe an external image in a clear state. In FIG. 2B, the visibility adjusting member 30 is fixed by the holder HD in a position where the visibility adjusting member 30 is arranged in the vicinity of the virtual-image forming member 20.

A member that should be the visibility adjusting member 30 is adjusted according to a degree of correction of the eyesight of the wearer. Therefore, for example, a plurality of members may be prepared as the member that should be the visibility adjusting member 30. More specifically, when the wearer purchases the virtual image display device 100, the wearer may select, as the visibility adjusting member 30, a lens having a correction degree matching the eyesight of the wearer out of a prepared plurality of lenses. When a plurality of wearers use the virtual image display device 100, each of the wearers may select, as the visibility adjusting member 30, according to the eyesight of each of the wearers, a lens having a correction degree matching the eyesight. In other words, the wearer can appropriately select, on the basis of the eyesight of the wearer, as the visibility adjusting member 30, a lens having a correction degree matching the eyesight out of a plurality of prepared lenses. As explained above, when the visibility adjusting member 30 is detachably attachable to the frame FL, it is possible to select a lens having an optimum correction degree according to a wearer having a different correction degree.

In the above explanation, the visibility adjusting member 30 is replaceable. Once a lens matching a correction degree of the eyesight of the wearer is selected as the visibility adjusting member 30, the lens may be fixed and assembled to the frame FL and not detached thereafter.

Even if the wearer is a person who does not need correction of eyesight, in FIG. 2B, a transparent lens, i.e., a lens, an adjustment degree of which is zero, may be selected and assembled as the visibility adjusting member 30. In other words, the visibility adjusting member 30 may be the lens, an adjustment degree of which is zero. In this case, it is possible to surely protect the virtual-image forming member 20 with the visibility adjusting member 30. It is also conceivable to further add various functions to the visibility adjusting member 30. For example, a UV cut lens may be used for the visibility adjusting member 30 to protect the eye from an ultraviolet ray. The visibility adjusting member 30 may play a role of a shade. It is also possible to impart the functions to the virtual-image forming member 20. For example, the supporting member 20b of the virtual-image forming member 20 may have the functions of the UV cut and the shade.

Figure 3:
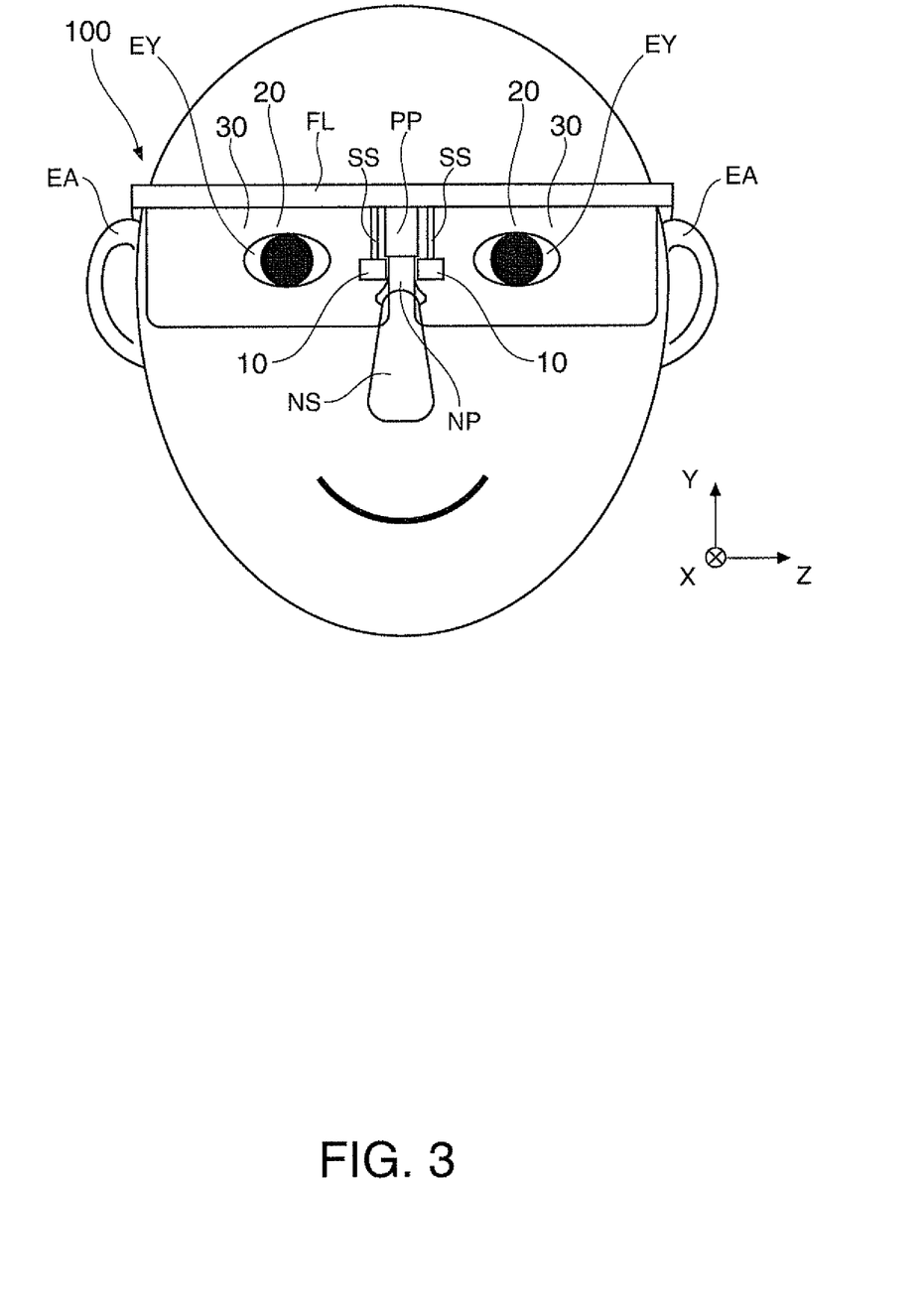
FIG. 3 is a front view schematically showing a state in which the virtual image display device is worn.

FIG. 3 is a front view schematically showing a state in which the virtual image display device 100 explained above is worn. In an example shown in the figure, the light-emitting device 10 is supported by a supporting body SS, which extends from the frame FL, to be arranged around the nose NS and in a position further on the +X side than the virtual-image forming member 20 and the visibility adjusting member 30. In the example shown in the figure, the virtual image display device 100 includes a column section PP that extends from the center of the frame FL and supports the virtual-image forming member 20 from a side and includes, on the distal end side of the column section PP, a nose pad section NP for enabling the virtual image display device 100 to be supported by the nose NS during wearing of the virtual image display device 100.

Figure 4A:
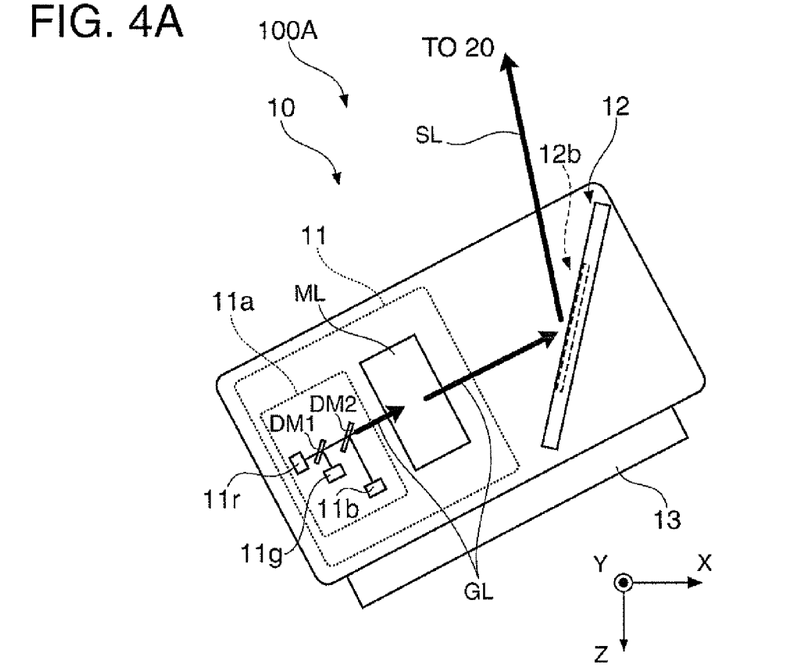
FIG. 4A is a diagram for explaining an example of the structure of a light emitting device.
Figure 4B:
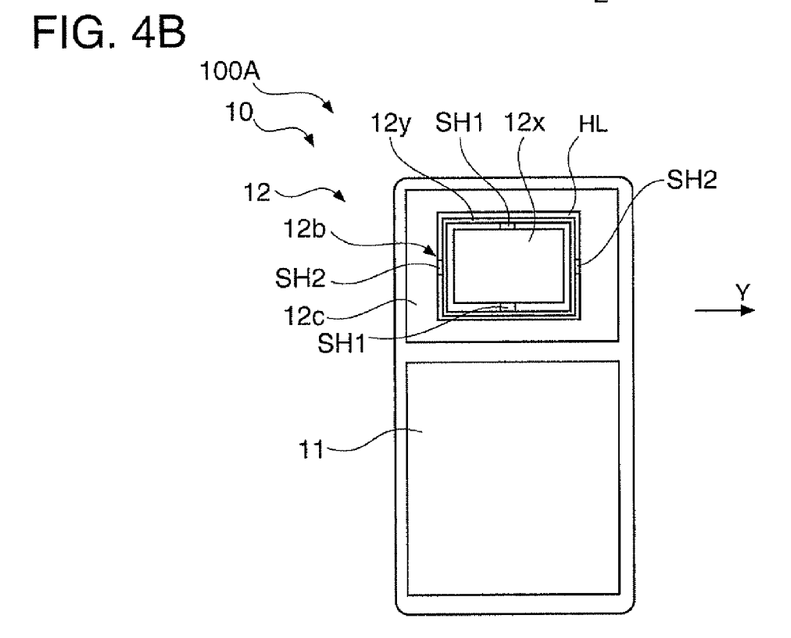
FIG. 4B is a diagram of the light emitting device, shown in FIG. 4A, viewed from another direction.

An example of the structure of the light emitting device 10 is explained below with reference to FIG. 4A and the like. The light emitting device 10 includes, as shown in FIGS. 4A and 4B, a signal-light modulating unit 11 functioning as a signal-light forming unit, the scanning optical system 12, and a driving control circuit 13. Various signals concerning an image and sound sent to the virtual image display device 100 are transmitted to the driving control circuit 13 through a cable (not shown in the figure) housed in the frame FL (see FIG. 1) of the virtual image display device 100.

As shown in FIG. 4A, the signal-light modulating unit 11 includes a combined-light forming unit 11a and a relay lens ML. The combined-light forming unit 11a forms combined light, which is signal light GL that should be the image lights PL (see FIG. 1). Therefore, the combined-light forming unit 11a includes color light sources 11r, 11g, and 11b that generate color lights of red (R light), green (G light), and blue (B light) and first and second dichroic mirrors DM1 and DM2 for combining the color lights generated by the color light sources 11r, 11g, and 11b. The relay lens ML is a lens that adjusts a light beam state of the signal light GL. The scanning optical system 12 includes a MEMS mirror unit 12b functioning as a scan unit that two-dimensionally scans, in the virtual-image forming member 20, the signal light GL emitted by the relay lens ML.

In the signal-light modulating unit 11, the color light sources 11r, 11g, and 11b are diode laser light sources or LED light sources. The red light source 11r emits light in a specific wavelength band for generating red light. The green light source 11g emits light in a specific wavelength band for generating green light. The blue light source 11b emits light in a specific wavelength band for generating blue light. The color light sources 11r, 11g, and 11b emit the color lights with the direction of light beams adjusted such that the color lights travel in the direction of the first dichroic mirror DM1 or the second dichroic mirror DM2.

The first dichroic mirror DM1 transmits light in the specific wavelength band for generating the red light and reflects lights in the other specific wavelength bands. The second dichroic mirror DM2 transmits lights in the specific wavelength bands for generating the red light and the green light and reflects light in the other specific wavelength band. Consequently, the signal light GL obtained by combining the color lights of the three colors is formed.

The relay lens ML adjusts a divergence angle of the signal light GL, which is the combined light formed by the combined-light forming unit 11a, and emits the signal light GL to the MEMS mirror unit 12b functioning as the scan unit of the scanning optical system 12.

As shown in FIG. 4B, the scanning optical system 12 includes a MEMS mirror unit 12b and a peripheral member 12c. The MEMS mirror unit 12b is housed in a hole HL having a rectangular shape provided in the center of the scanning optical system 12 by the peripheral member 12c. The MEMS mirror unit 12b can incline in an arbitrary direction.

The MEMS mirror unit 12b is explained below. The MEMS mirror unit 12b includes a MEMS mirror body unit 12x rotatable with respect to one axis direction, a mirror frame body 12y that is a frame surrounding the MEMS mirror body unit 12x and rotatable with respect to an axis direction perpendicular to the one axis direction, a pair of first shafts SH1 connected to the mirror frame body 12y, and a pair of second shafts SH2 connected to the peripheral member 12c. Since the axis direction of the first shafts SH1 and the axis direction of the second shafts SH2 are perpendicular to each other, the MEMS mirror unit 12b is rotatable in the two axis directions. The MEMS mirror unit 12b can incline in an arbitrary direction and enables the two-dimensional scanning of the scanning lights SL, which are beams to be emitted.

The operation of image formation is explained below. As shown in FIG. 4A, first, the signal-light modulating unit 11 of the light emitting device 10 forms the signal light GL and emits the signal light GL. The emitted signal light GL is made incident on the relay lens ML. The signal light GL emitted from the relay lens ML is made incident on the MEMS mirror unit 12b functioning as the scan unit. The MEMS mirror unit 12b emits the signal light GL to the virtual-image forming member 20 as the scanning lights SL. In the virtual-image forming member 20, the scanning lights SL are scanned and made incident by the MEMS mirror unit 12b. Consequently, a virtual image is formed by the image lights PL shown in FIG. 1. The wearer captures the virtual image with the eyes EY to recognize an image.

In the operation for irradiating the scanning lights SL on the virtual-image forming member 20 using the scanning optical system 12, the driving control circuit 13 controls the MEMS mirror unit 12b taking into account a positional relation between the light emitting device 10 and the virtual-image forming member 20 and the shape of the region to be irradiated of the virtual-image forming member 20. As explained above, the virtual-image forming member 20 has the shape bent along the frame FL. The scanning is performed according to the shape to prevent distortion and the like from occurring in the formation of a virtual image.

In the formation of a virtual image, there are several methods for showing a focused virtual image to the wearer. First, as one method, the light emitting device 10 is driven by the driving control circuit 13 to change the position of a virtual image in the optical axis direction, i.e., parallelism of light entering the eye EY. Consequently, it is possible to perform, according to the visibility of the wearer, adjustment to enable the wearer to view the virtual image with the naked eye. As another method, in the scan type explained above, a beam diameter of image light is set sufficiently thin. Consequently, it is possible to increase an F number, increase depth of focus, and form an image without a blur. In this case, both of a person who needs correction of eyesight and a person who does not need correction of eyesight can observe an image formed by the virtual image. In other words, visibility adjustment is unnecessary.

As explained above, in the virtual image display device 100 according to this embodiment, the image lights PL formed by the light emitting device 10 and the virtual-image forming member 20 and the external light CI, transmitted through the visibility adjusting member 30 and the virtual-image forming member 20 can be observed in parallel in a see-through manner. In the observation of the external light OL, the visibility adjusting member 30 enables visibility adjustment corresponding to the eyesight of the wearer. Therefore, the wearer can observe the external light OL without wearing a device for visibility adjustment such as glasses. It is possible to suppress an increase in the size of the virtual image display device 100.

In the configuration explained above, as the visibility adjusting member 30, for example, a member that can change visibility by combining two slidable lenses may be used. In this case, the visibility can be adjusted to various degrees by one kind of visibility adjusting member 30.

In the structure of the signal-light modulating unit 11 shown in FIG. 4A and the like, the lights from the color light sources 11r, 11g, and 11b are combined in the formation of the signal light GL in the combined-light forming unit 11a. However, this is an example in the signal light formation in this embodiment. The signal light GL can be formed by other configurations as well.

Second Embodiment

A virtual image display device according to a second embodiment is explained below. The virtual image display device according to this embodiment is a modification of the virtual image display device 100 according to the first embodiment. Unless specifically explained, it is assumed that the virtual image display device is the same as the virtual image display device 100 according to the first embodiment.

Figure 5:
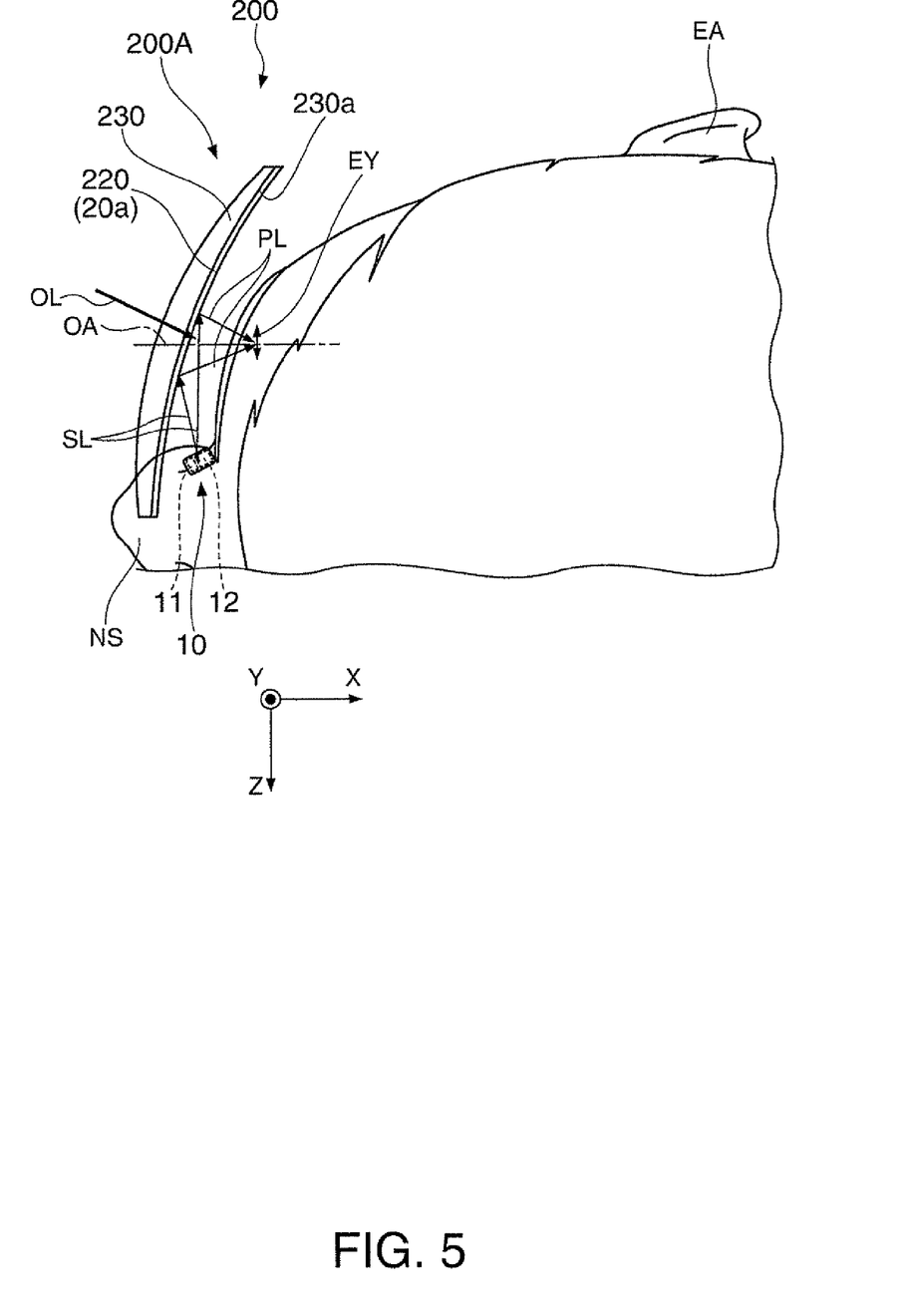
FIG. 5 is a diagram showing a virtual image display device according to a second embodiment.

As shown in FIG. 5, in a first display device 200A included in a virtual image display device 200 according to this embodiment, a virtual-image forming member 220 and a visibility adjusting member 230 are integrated. More specifically, the semitransparent reflection film 20a is formed on an inner surface 230a, which is a surface opposed to a wearer side, among the surfaces of the visibility adjusting member 230. The semitransparent reflection film 20a functions as the virtual-image forming member 220. In other words, the semitransparent reflection film 20a functioning as the virtual-image forming member 220 is a film to be irradiated supported by the visibility adjusting member 230. In this case, the virtual-image forming member 220 is formed of a substantially uniform film. The virtual-image forming member 220 hardly affects a lens effect of the visibility adjusting member 230, i.e., does not have visibility.

As explained above, the virtual-image forming member 220 is configured as a member formed integrally with the visibility adjusting member 230 to be located on the inner surface 230a, which is the surface on the wearer side during wearing of the virtual image display device 200, among the surfaces of the visibility adjusting member 230. Consequently, it is possible to support and stabilize the thin film-like virtual-image forming member 220 with the visibility adjusting member 230 and realize a reduction the weight and a reduction in the size of the device. In this case, since a gap is not formed between the virtual-image forming member 220 and the visibility adjusting member 230, it is possible to reduce the possibility that other unnecessary light adversely affects image light and external light. In other words, it is possible to further suppress deterioration in a virtual image and an external image compared with a configuration in which the virtual-image forming member 220 and the visibility adjusting member 230 are separately formed. A configuration same as the configuration in this embodiment may be obtained by bonding the semitransparent reflection film 20a to be stuck to the inner surface 230a of the visibility adjusting member 230.

Third Embodiment

A virtual image display device according to a third embodiment is explained below. The virtual image display device according to this embodiment is a modification of the virtual image display device 100 according to the first embodiment. Unless specifically explained, the virtual image display device is the same as the virtual image display device 100 according to the first embodiment.

Figure 6:
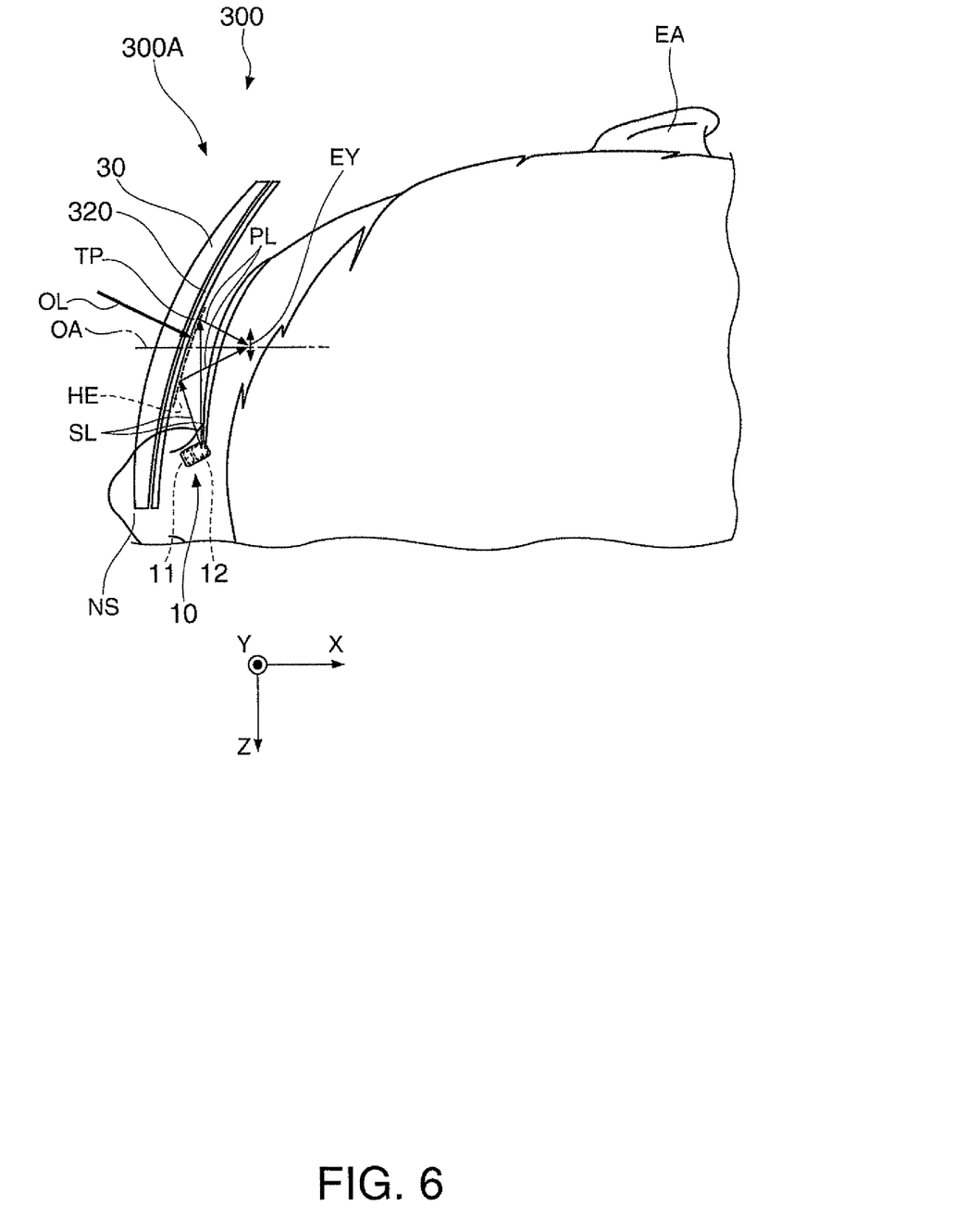
FIG. 6 is a diagram showing a virtual image display device according to a third embodiment.

As shown in FIG. 6, a virtual-image forming member 320 of a first display device 300A included in a virtual image display device 300 according to this embodiment includes a transparent substrate TP and a hologram element HE. Specifically, the virtual-image forming member 320 has a configuration in which the hologram element HE, which is an example of a diffraction grating, is provided on the transparent substrate TP that allows light to pass. The hologram element HE is formed on a region to be irradiated, which is a range in which the scanning lights SL are irradiated. The hologram element HE is a semitransparent film having a characteristic of diffracting light in a specific wavelength band and transmitting lights in other wavelength bands. The hologram element HE adjusts the image lights PL in a specific wavelength band to set an incident angle and a light beam state to a desired incident angle and a desired light beam state making use of diffraction and forms a virtual image. The hologram element HE allows most of components of the external light OL in a wide range of a wavelength band to pass. The hologram element HE is a thin film-like member and supported by the transparent substrate TP. With the configuration explained above, the virtual-image forming member 320 forms a virtual image by diffracting the image lights PL on the hologram element HE and, on the other hand, allows the external light OL to pass through the transparent substrate TP and the hologram element HE. In this case, the virtual image display device 300 has a see-through configuration for enabling the wearer to recognize the external light OL passed through the visibility adjusting member 30 and the transparent substrate TP and the hologram element HE included in the virtual-image forming member 320. With the configuration explained above, a light emitting direction can be adjusted on the side of the hologram element HE, which is the thin film-like member. Therefore, it is possible to increase a degree of freedom of the shape of the virtual-image forming member 320 and improve the design properties of the virtual image display device 300.

Fourth Embodiment

A virtual image display device according to a fourth embodiment is explained below. The virtual image display device according to this embodiment is a modification of the virtual image display device 100 according to the first embodiment. Unless specifically explained, the virtual image display device is the same as the virtual image display device 100 according to the first embodiment.

Figure 7:
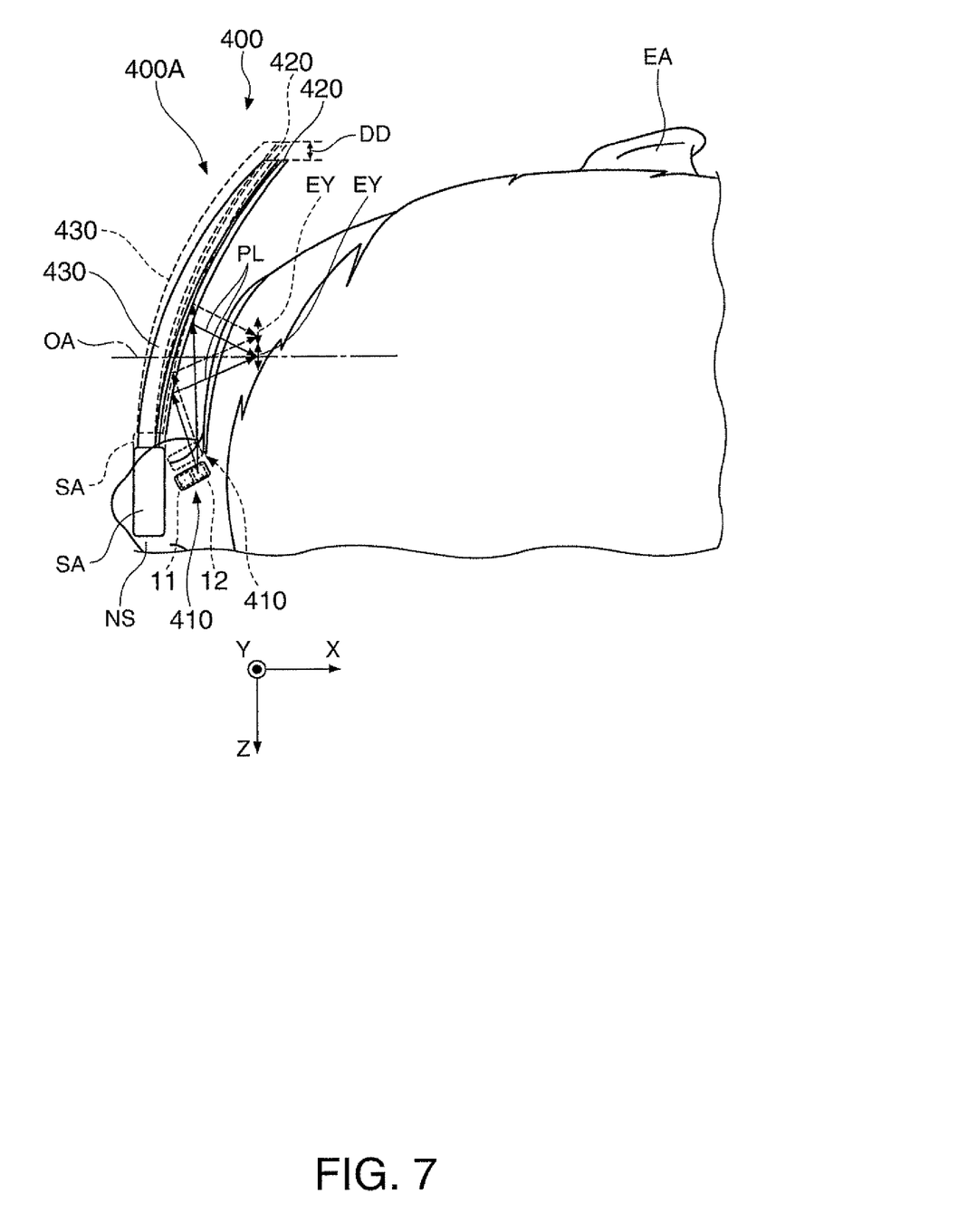
FIG. 7 is a diagram showing a virtual image display device according to a fourth embodiment.

As shown in FIG. 7, a first display device 400A included in a virtual image display device 400 according to this embodiment includes an eye-width adjusting section SA that adjusts the positions of a light emitting device 410, a virtual-image forming member 420, and a visibility adjusting member 430 according to the eye width (a distance between both the eyes of a human) of a wearer. There is a difference in the eye width of a human depending on a race, a sex, or an individual. In this embodiment, eye width adjustment is performed by enabling a distance from the nose NS to the eye EY, which is equivalent to the eye width, to be adjusted by the eye-width adjusting section SA.

The eye-width adjusting section SA can move, with a not-shown slide mechanism, the light emitting device 410 including the scanning optical system 12, the virtual-image forming member 420, and the visibility adjusting member 430 integrally in a Z direction, which is the lateral direction for the wearer. As shown in the figure, the light emitting device 410, the virtual-image forming member 420, and the visibility adjusting member 430 can be adjusted in a range of adjustment width DD in the Z direction. Sufficient position adjustment can be performed by setting the adjustment width DD in a range including a general difference in the eye width of a human. In the adjustment by the eye-width adjusting section SA, the light emitting device 410, the virtual-image forming member 420, and the visibility adjusting member 430 are integrally moved. Consequently, it is possible to align the eye width while keeping constant a projection state from the light emitting device 410 side to the virtual-image forming member 420 and a relative positional relation between the virtual-image forming member 420 and the visibility adjusting member 430.

In the above explanation, the light emitting device 410, the virtual-image forming member 420, and the visibility adjusting member 430 are integrally moved. However, if at least the light emitting device 410 and the virtual-image forming member 420 can be integrally moved by the eye-width adjusting section SA, the projection state from the light emitting device 410 side to the virtual-image forming member 420 can be prevented from changing and image formation can be secured.

Fifth Embodiment

A virtual image display device according to a fifth embodiment is explained below. The virtual image display device according to this embodiment is a modification of the virtual image display device 100 according to the first embodiment. Unless specifically explained, the virtual image display device is the same as the virtual image display device 100 according to the first embodiment.

Figure 8:
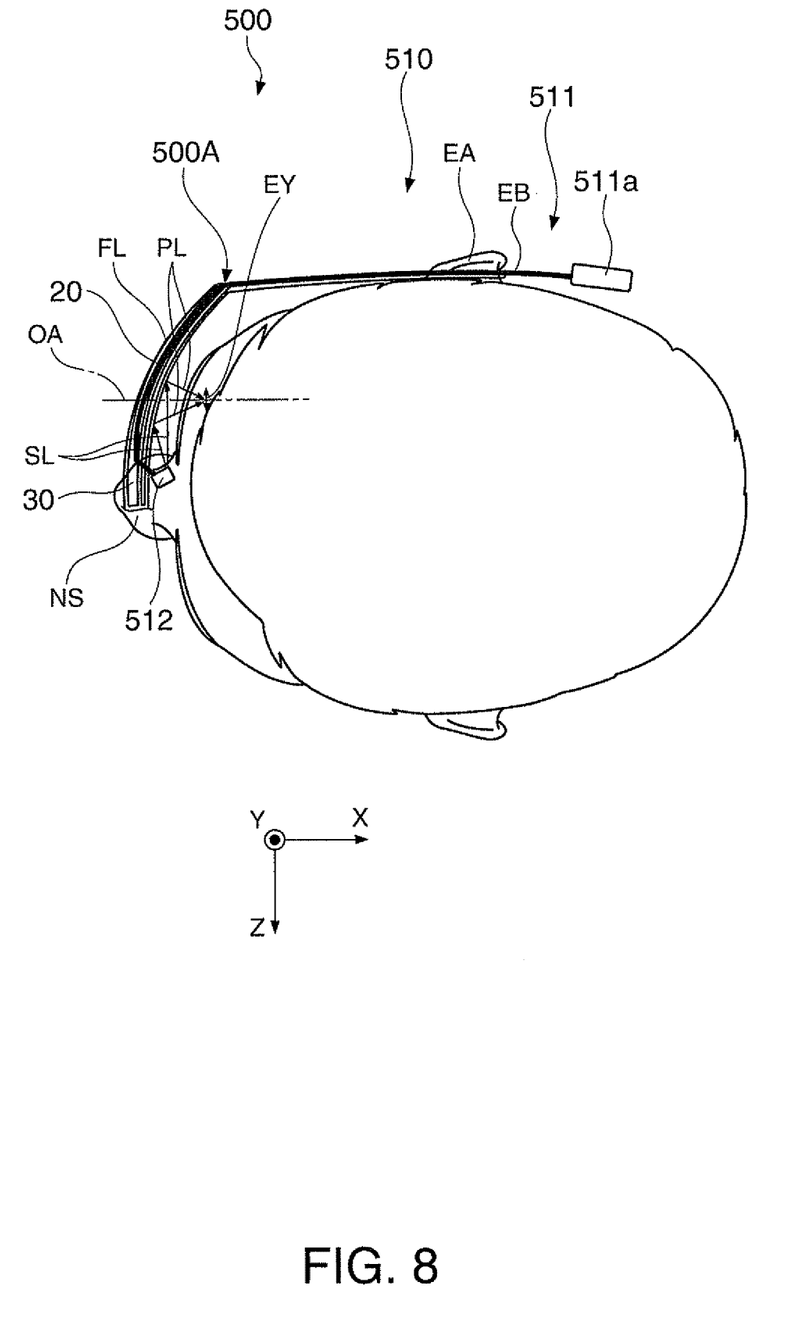
FIG. 8 is a diagram showing a virtual image display device according to a fifth embodiment.

As shown in FIG. 8, a virtual image display device 500 according to this embodiment includes a light emitting device 510, the virtual-image forming member 20, and the visibility adjusting member 30. The light emitting device 510 includes a signal-light modulating unit 511 including a light source unit and a scanning optical system 512 including a scan unit. The signal-light modulating unit 511 includes a combined-light forming unit 511a for forming combined light, which should be image light, an optical fiber FB, and the relay lens ML (see FIG. 9). As shown in FIG. 8, in the light emitting device 510, the combined-light forming unit 511a and the scanning optical system 512 are separated. The optical fiber FE connects the combined-light forming unit 511a and the scanning optical system 512. In other words, the members included in the light emitting device 510 can be dispersedly arranged. As an example, it is assumed that the optical fiber FB extends from an ear EA side to the nose NS side through the periphery of the eye EY along the face shape of a wearer to connect the combined-light forming unit 511a present on the ear EA side and the scanning optical system 512 present in the periphery of the nose NS.

Figure 9:
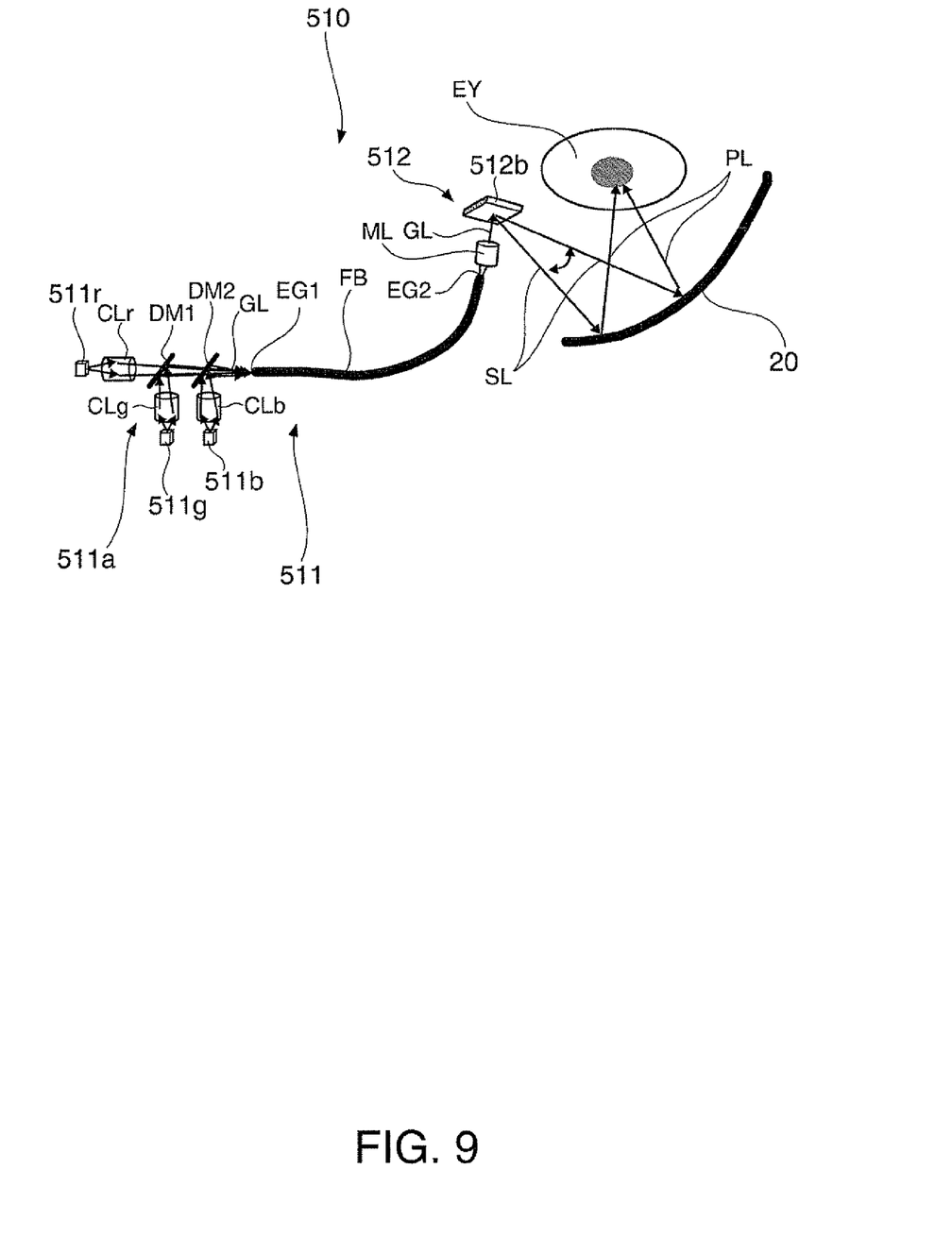
FIG. 9 is a schematic diagram for explaining an example of the structure of a light emitting device.

An overview of the units of the light emitting device 510 is explained with reference to FIG. 9 schematically showing the structure of the light emitting device 510. First, in the light emitting device 510, the signal-light modulating unit 511 includes, as the combined-light forming unit 511a, color light sources 511r, 511g, and 511b for three colors, which are light source units for red, green, and blue, the condensing lenses CLr, CLg, and CLb that respectively condense color lights emitted from the color light sources 511r, 511g, and 511b, and the first and second dichroic mirrors DM1 and DM2 for combining the color lights emitted by the condensing lenses CLr, CLg, and CLb. The signal-light modulating unit 511 includes the optical fiber FB that propagates combined light, which is the signal light GL formed by the combined-light forming unit 511a, to the scanning optical system 512. Further, the signal-light modulating unit 511 includes the relay lens ML for adjusting a divergence state of the light propagated by the optical fiber FB.

The optical fiber FB includes a first fiber end EG1 connected to the signal-light modulating unit 511 and a second fiber end EG2 connected to the scanning optical system 512. The signal light GL, which is the combined light emitted from the combined-light forming unit 511a, is captured into the optical fiber FB from the first fiber end EG1, which is one end, propagated through the inside of the optical fiber FE, and emitted from the second fiber end EG2, which is the other end, to the relay lens ML arranged on the scanning optical system 512 side.

The relay lens ML emits the signal light GL, which is propagated through the optical fiber FE, to the scanning optical system 512 with a divergence state of light beams adjusted (e.g., the light beams changed to parallel beams).

The scanning optical system 512 includes a MEMS mirror unit 512b, which is a scan unit that emits the signal light GL, which is emitted from the relay lens ML, as the scanning lights SL and two-dimensionally scans the scanning lights SL in the virtual-image forming member 20.

The operation of image formation is explained below. First, diode lasers or LED lights emitted from the color light sources 511r, 511g, and 511b in the light emitting device 510 are respectively condensed by the condensing lenses CLr, CLg, and CLb corresponding to the color light sources 511r, 511g, and 511b and combined by the dichroic mirrors DM1 and DM2 to form combined light, which is the signal light GL. The signal light GL, which is the combined light, is condensed at and coupled to the first fiber end EG1 of the optical fiber FE. Further, the signal light GL is propagated through the optical fiber FB and, after being emitted from the second fiber end EG2, made incident on the rely lens ML. The signal light GL is made incident on the MEMS mirror unit 512b, which is the scan unit of the scanning optical system 512, with a divergence state of a light beam adjusted in the relay lens ML. The MEMS mirror unit 512b scans the virtual-image forming member 20, which is the half mirror, using the signal light GL as the scanning lights SL. Consequently, a virtual image is formed and the image lights PL for causing the wearer to recognize the virtual image is led to the eye EY of the wearer.

In this embodiment, the combined-light forming unit 511a, which is a device that substantially forms the image lights PL, is arranged on the ear EA side rather than the nose NS side or the eye EY side. Only the scanning optical system 512 is arranged in the periphery of the nose NS. The modulated signal light GL is propagated from the combined-light forming unit 511a to the scanning optical system 512. Therefore, it is possible to disperse the weight of the entire virtual image display device 500 and adjust the balance of the center of gravity. Consequently, the feeling of the weight of the virtual image display device 500 on the wearer is reduced to enable more comfortable viewing. Since the optical fiber FE is arranged along the frame FL, it is possible to arrange the optical fiber FB less conspicuously in design.

In the above explanation, the combined-light forming unit 511a is arranged on the ear EA side. However, if the length and the shape of the optical fiber FB are changed as appropriate, it is also possible to arrange the combined-light forming unit 511a in a place other than the ear EA side. Consequently, it is possible to increase a degree of freedom of design of the entire virtual image display device 500.

The invention is not limited to the embodiments. It is possible to carry out the invention in various forms without departing from the spirit of the invention.

In the above explanation, the diode laser light sources or the LED light sources are used as the light sources. However, the light sources may be light sources other than the above such as organic ELs.

In the virtual image display device 100 and the like according to the embodiments, the light emitting device 10 and the like are provided to correspond to both the right and left eyes. However, the light emitting device 10 and the like may be provided for one of the right and left eyes to allow the wearer to view an image with one eye.

Figure 10:
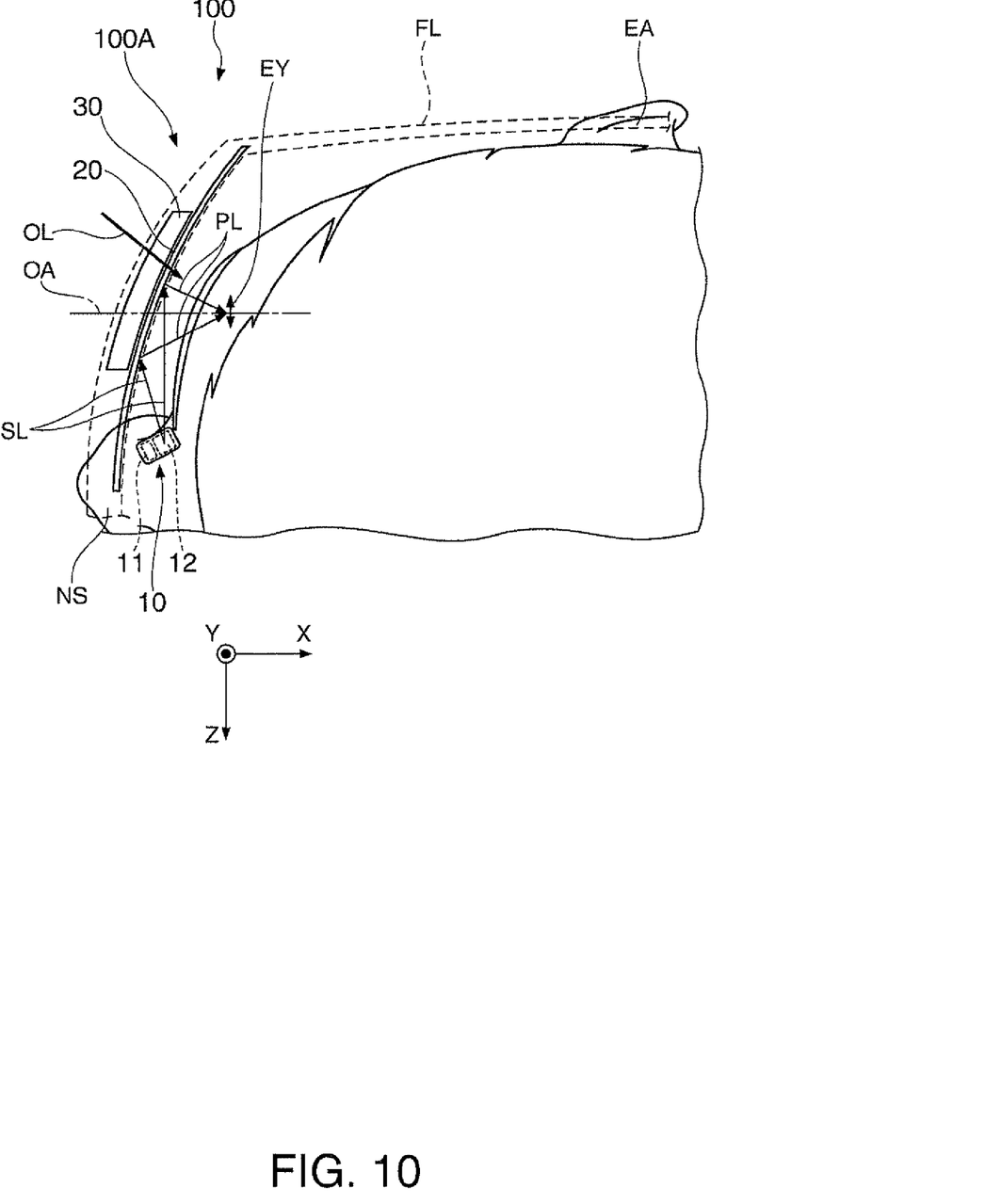
FIG. 10 is a diagram showing an example of another virtual image display device.

In the embodiments, for example, in FIG. 1, the visibility adjusting member 30 is configured to cover substantially the entire virtual-image forming member 20. However, the present invention is not limited to this. For example, as shown in FIG. 10, the visibility adjusting member 30 set according to the position of the eye EY may be configured to be smaller than the member to be irradiated 20 and cover only a part of the member to be irradiated 20.

The entire disclosure of Japanese Patent Application No. 2012-050121, filed Mar. 7, 2012 is expressly incorporated by reference herein.

What is claimed is:

1. A virtual image display device comprising:
a signal-light modulating unit configured to emit a signal light modulated according to an image;
a scanning optical system configured to scan the signal light made incident from the signal-light modulating unit to thereby emit the signal light as scanning light;
a virtual-image forming member configured to receive irradiation of the scanning light from the scanning optical system and form a virtual image; and
a visibility adjusting member configured to adjust visibility to allow a wearer to view the external environment, wherein
the visibility adjusting member is arranged to be located further on an outer side than the virtual-image forming member with respect to an eye of the wearer.

2. The virtual image display device according to claim 1, wherein the virtual-image forming member includes a semitransparent film configured to receive the scanning light emitted from the scanning optical system to form a virtual image, allow external light to pass, and enable observation of the virtual image by the scanning light and observation of the external light.

3. The virtual image display device according to claim 1, wherein the visibility adjusting member is arranged adjacent to the virtual-image forming member to cover the virtual-image forming member.

4. The virtual image display device according to claim 3, wherein the scanning optical system is arranged to be located closer to a nose side than the eye of the wearer during wearing of the virtual image display device and arranged to be located closer to the wearer than the virtual-image forming member.

5. The virtual image display device according to claim 1, wherein the virtual-image forming member is formed integrally to be located on an inner surface that is on the wearer side during wearing of the virtual image display device among surfaces of the visibility adjusting member.

6. The virtual image display device according to claim 5, wherein the virtual-image forming member is a film to be irradiated supported by the visibility adjusting member.

7. The virtual image display device according to claim 1, wherein the visibility adjusting member is detachably attached.

8. The virtual image display device according to claim 7, wherein the virtual-image forming member includes:
a film to be irradiated configured to receive irradiation of the scanning light; and
a supporting member configured to support the film to be irradiated.

9. The virtual image display device according to claim 1, wherein the virtual-image forming member includes a diffraction grating for forming the virtual image with the scanning light irradiated from the scanning optical system.

10. The virtual image display device according to claim 1, wherein the virtual image display device further includes an eye-width adjusting section configured to enable, according to eye width of the wearer, at least the scanning optical system and the virtual-image forming member among the scanning optical system, the virtual-image forming member, and the visibility adjusting member to integrally move with respect to a position of the eye of the wearer during wearing of the virtual image display device.

11. The virtual image display device according to claim 1, wherein
the signal-light modulating unit includes:
a combined-light forming unit configured to form, as the signal light, combined light obtained by combining R light, G light, and B light; and
an optical fiber configured to propagate the signal light formed by the combined-light forming unit to the scanning optical system, and
in the signal-light modulating unit, the combined-light forming unit is arranged in a position corresponding to an ear side and the optical fiber extends along a path from a periphery of the ear to a periphery of the nose through a periphery of the eye along a face shape of the wearer during wearing of the virtual image display device to propagate the modulated signal light from the combined-light forming unit to the scanning optical system.

* * * * *